(12) United States Patent
Suzuki

(10) Patent No.: US 7,617,034 B2
(45) Date of Patent: Nov. 10, 2009

(54) CONTROL APPARATUS FOR OPENING/CLOSING BODY

(75) Inventor: Shintaro Suzuki, Kasugai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 930 days.

(21) Appl. No.: 11/168,389

(22) Filed: Jun. 29, 2005

(65) Prior Publication Data
US 2005/0288840 A1    Dec. 29, 2005

(30) Foreign Application Priority Data
Jun. 29, 2004    (JP) ............... 2004-192130

(51) Int. Cl.
*E05F 11/38* (2006.01)
(52) U.S. Cl. .......................... 701/49; 49/280
(58) Field of Classification Search ................ 701/49, 701/36, 42; 49/280, 360; 318/282
See application file for complete search history.

(56) References Cited

U.S. PATENT DOCUMENTS

| | | | |
|---|---|---|---|
| 6,009,671 A * | 1/2000 | Sasaki et al. | 49/352 |
| 6,425,206 B1 | 7/2002 | Noda et al. | |
| 6,430,875 B1 | 8/2002 | Clark et al. | |
| 6,580,243 B2 * | 6/2003 | Itami et al. | 318/452 |
| 7,406,377 B2 * | 7/2008 | Shiga | 701/49 |
| 2003/0018419 A1 | 1/2003 | Zhou et al. | |

FOREIGN PATENT DOCUMENTS

| DE | 102 32 704 A1 | 3/2003 |
|---|---|---|
| JP | 2003-301662 | 10/2003 |

* cited by examiner

*Primary Examiner*—Dalena Tran
(74) *Attorney, Agent, or Firm*—Sughrue Mion, PLLC

(57) ABSTRACT

A control unit controls a sliding door that opens and closes an opening in a vehicle body by moving with respect to the vehicle body. The control unit includes a drive motor that switches between a low-speed mode for moving the sliding door with a relatively high torque at a low velocity and a high-speed mode for moving the sliding door with a relatively low torque at a high velocity, a rotary sensor that detects the position and velocity of the sliding door with respect to the vehicle body, and a control unit that compares the velocity of the sliding door with a threshold velocity when the sliding door reaches a first predetermined position and sets the drive motor to one of the low-speed mode and the high-speed mode depending on the result of comparison.

18 Claims, 5 Drawing Sheets

CONTROL APPARATUS FOR OPENING/CLOSING BODY

CROSS REFERENCE TO RELATED APPLICATIONS

This application is based on and claims priority under 35 U.S.C. § 119 to Japanese Patent Application 2004-192130, filed on Jun. 29, 2004, the entire content of which is incorporated herein by reference.

FIELD OF THE INVENTION

The present invention relates to a control apparatus for an opening/closing body that opens/closes an opening formed in a vehicle.

BACKGROUND

Vehicles generally include opening/closing bodies such as electric window regulators, sunroofs, and sliding doors. When an opening/closing body is opened or closed using an electric drive motor, there are some regions where a driving force (torque) required for the opening/closing operation is larger than that required in other regions. For example, in an operation of opening a sliding door (opening/closing body), a large driving force is required at a fully open position since the sliding door is locked at this position to maintain the fully open state.

Accordingly, various structures for exerting a torque high enough to move the sliding door in the above-described operation have been suggested. For example, Japanese Unexamined Patent Application Publication No. 2003-301662 (FIG. 2) discloses a control apparatus including a drive motor (14) which switches between a low-speed mode for moving an opening/closing body with a relatively high torque at a low velocity and a high-speed mode for moving the opening/closing body with a relatively low torque at a high velocity. The control apparatus switches the mode of the drive motor (14) at a predetermined position and controls a voltage applied to the drive motor (14) such that the moving velocities of the sliding door before and after the sliding door reaches the predetermined position are substantially the same.

In this apparatus, the mode is switched depending on whether or not the sliding door has reached the predetermined position. Therefore, there is a risk that the drive motor cannot be adequately controlled when the sliding door receives load. For example, when a vehicle is on a slope, the sliding door receives load in the direction of inclination of the slope. Therefore, there is a risk that a torque high enough to lock the sliding door at the fully open position cannot be obtained at the final stage of the opening operation, where a large driving force is required.

SUMMARY OF THE INVENTION

In light of this situation, an object of the present invention is to provide a control apparatus for an opening/closing body that can adequately move the opening/closing body.

In order to achieve this object, according to an embodiment of the present invention, a control apparatus for controlling an opening/closing body that opens and closes an opening in a vehicle body by moving with respect to the vehicle body includes a drive motor that switches between a low-speed mode for moving the opening/closing body with a relatively high torque at a low velocity and a high-speed mode for moving the opening/closing body with a relatively low torque at a high velocity; a position sensor that detects the position of the opening/closing body with respect to the vehicle body; a velocity sensor that detects the velocity of the opening/closing body; and a control unit that compares the velocity of the opening/closing body with a threshold velocity when the opening/closing body reaches a first predetermined position and sets the drive motor to one of the low-speed mode and the high-speed mode depending on the result of comparison.

According to the present invention, when the position sensor detects that the sliding door has reached the first predetermined position, the control unit compares the moving velocity of the sliding door detected by the velocity sensor with the threshold velocity, and drives the drive motor in the high-speed mode or the low-speed mode depending on the result of comparison. Thus, the drive motor is set to the high-speed mode or the low-speed mode depending on the actual velocity of the opening/closing body at the first predetermined position, and the mode is selected in accordance with the state of the opening/closing body. Accordingly, the opening/closing body is adequately moved irrespective of the load applied to the opening/closing body.

In the control apparatus according to the embodiment of the present invention, the control unit may set the driver motor to the high-speed mode when the velocity of the opening/closing body is increased to the threshold velocity, and to the low-speed mode when the velocity of the opening/closing body is not increased to the threshold velocity.

Accordingly, the control unit sets the drive motor to the high-speed mode or the low-speed mode depending on whether or not the velocity of the opening/closing body is increased to the threshold velocity at the first predetermined position. Therefore, when the opening/closing body is moving at the threshold velocity, the drive motor is moved in the high-speed mode at a high velocity. If the opening/closing body is not moving at the threshold velocity because of load applied thereto, the drive motor is driven in the low-speed mode to exert a high torque so that the opening/closing body can be reliably moved.

In addition, in the control apparatus according to the embodiment of the present invention, the control unit may compare the velocity of the opening/closing body with the threshold velocity at the first predetermined position and set the drive motor to the high-speed mode or the low-speed mode at a second predetermined position depending on the result of comparison.

Accordingly, the mode at the second predetermined position is set in accordance with the result of comparison at the first predetermined position, and only mode setting is performed at the second predetermined position. Therefore, the control operation is efficiently performed.

In addition, in the control apparatus according to the embodiment of the present invention, the control unit may set a target velocity of the opening/closing body to a high target velocity or a low target velocity.

Accordingly, the target velocity of the opening/closing body is set to either the high target velocity or the low target velocity. Therefore, an adequate mode can be selected on the basis of the result of comparison between the velocity of the opening/closing body and the threshold velocity.

In addition, in the control apparatus according to the embodiment of the present invention, the control unit may perform PWM control of the drive motor to adjust the velocity of the opening/closing body to the high target velocity or the low target velocity.

Accordingly the PWM control of the drive motor is performed such that the moving velocity is adjusted to either the high target velocity or the low target velocity. Therefore, an adequate velocity control is performed.

In the control apparatus according to the embodiment of the present invention, the control unit may switch the drive motor between the high-speed mode and the low-speed mode such that the velocities of the opening/closing body immediately before and after switching are substantially the same.

Accordingly, when the mode of the drive motor is switched, velocities of the opening/closing body immediately before and after the mode is switched are substantially the same. Therefore, sudden change in the movement of the opening/closing body does not occur, and operability is ensured.

Accordingly, the present invention provides a control apparatus for an opening/closing body that can adequately move the opening/closing body.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described below with reference to the accompanying drawings.

Figure 1:
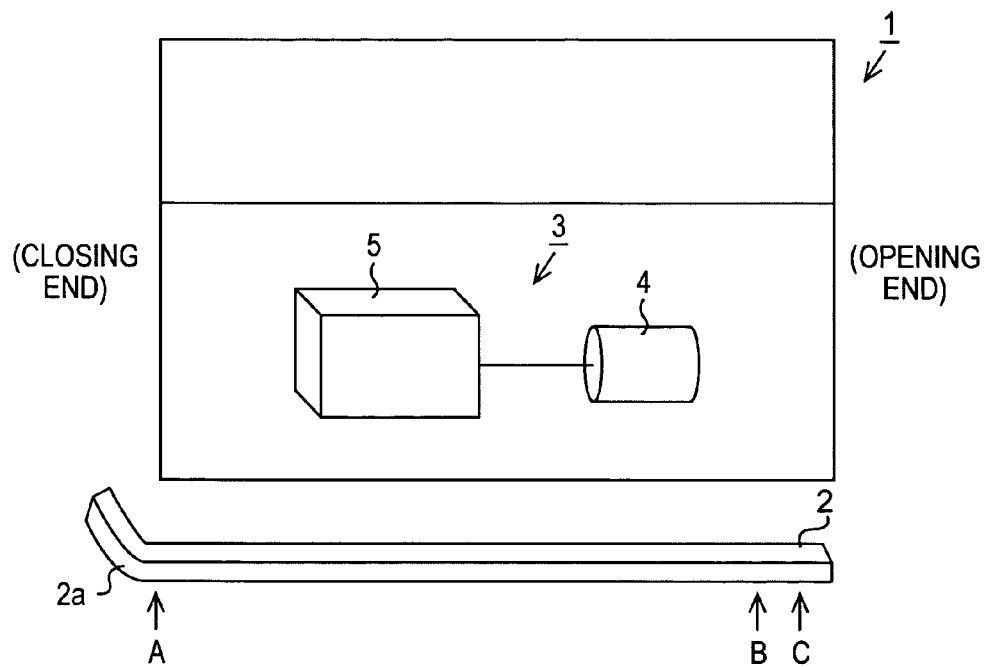
FIG. 1 is a schematic diagram showing an embodiment of the present invention.

As shown in FIG. 1, a sliding door 1, which functions as an opening/closing body, is slidably provided on a rail 2 with a known hinge. The rail 2 is positioned at the bottom of a door opening formed at a side of a vehicle (not shown), and the sliding door 1 opens and closes the door opening by sliding along the rail 2. The sliding door 1 is provided with a sliding-door control apparatus 3 (hereafter simply called a "control apparatus 3") for controlling the opening/closing operation of the sliding door 1.

The rail 2 extends in a front-back direction at the bottom of the door opening and has a curved portion 2a that curves toward a vehicle body at a closing end of the sliding door 1. The curved portion 2a is provided for pulling the sliding door 1 closer to the vehicle body when it is closed. When the sliding door 1 is at a fully open position, the sliding door 1 is locked with a lock mechanism (not shown) at an opening end of the sliding door 1 in a state such that the door opening is exposed. When the sliding door 1 is moved near the curved portion 2a or the fully open position where the sliding door 1 is locked, a large driving force is required compared to other regions of the rail 2.

A position A, a position B, and a position C of the rail 2 are defined in that order from the sliding-door closing end. The position A is at an end of the curved portion 2a nearer to the sliding-door closing end. The position C is a position where the sliding door 1 is locked at the fully open position thereof. The position B is nearer to the sliding-door closing end than the position C (in front of the position C in the sliding direction). In the present embodiment, the position B corresponds to a first predetermined position, and the position C corresponds to a second predetermined position. Velocity control according to the present embodiment is performed between the positions B and C.

The control apparatus 3 includes a drive motor 4 fixed to the sliding door 1 as a drive source and a control unit 5 for controlling the operation of the drive motor 4.

The drive motor 4 is connected to two wires (not shown) arranged between the vehicle body and the sliding door 1. More specifically, first ends of the two wires are fixed to a side surface of the vehicle body with an interval therebetween in the front-back direction of the vehicle, and second ends of the two wires are connected to the drive motor 4 through the inside of the sliding door 1. When the drive motor 4 is driven, one of the two wires is pulled into the sliding door 1 (toward the second end thereof), and the other one of the wires is pulled out toward the vehicle body (toward the first end thereof), so that the sliding door 1 moves along the rail 2. The control unit 5 will be described below.

Next, the electrical structure of the control apparatus 3 will be described below with reference to FIG. 2.

Figure 2:
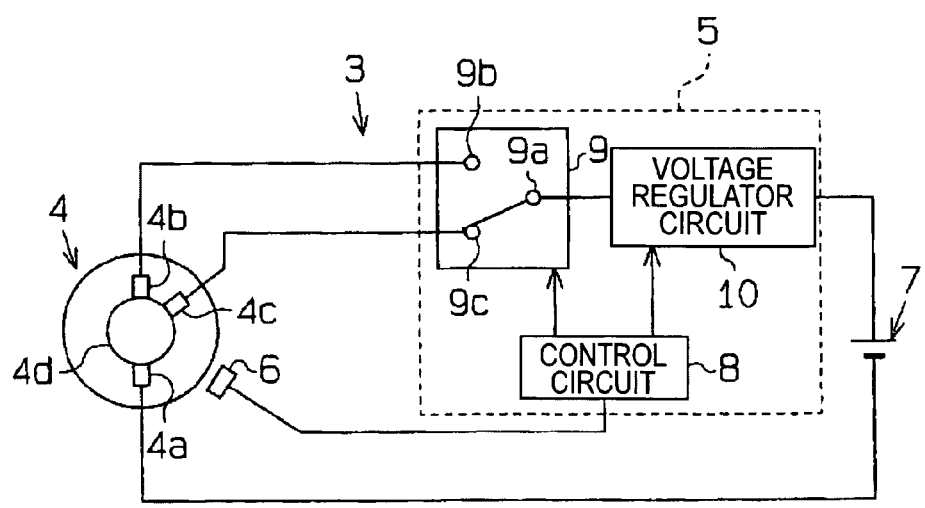
FIG. 2 is a block diagram showing an electrical structure according to the embodiment.

As shown in FIG. 2, the control apparatus 3 includes the drive motor 4, the control unit 5 that controls the operation of the drive motor 4, a rotary sensor 6 that is connected to the control unit 5 and that functions as a position sensor and a velocity sensor, and a battery 7.

The drive motor 4 is a direct-current motor and includes a common brush 4a, a high-speed brush 4b, and a low-speed brush 4c. The common brush 4a, the high-speed brush 4b, and the low-speed brush 4c are arranged so as to slide along the commutator 4d at different positions along the circumference of a commutator 4d. The control unit 5 includes a control circuit 8, a relay 9, and a voltage regulator circuit 10, and the relay 9 and the voltage regulator circuit 10 are controlled by the control circuit 8. The control circuit 8 switches the relay 9 such that a common terminal 9a is connected to either a first terminal 9b or a second terminal 9c. In addition, the control circuit 8 adjusts a voltage applied to the drive motor 4 by controlling the voltage regulator circuit 10.

In addition, the control circuit 8 receives a signal from the rotary sensor 6. The rotary sensor 6 detects the position of the sliding door 1 with respect to the vehicle body on the basis of the number of output pulses. In addition, the rotary sensor 6 also detects the rotational speed (number of rotations per unit time) of the drive motor 4, that is, the moving velocity of the sliding door 1 with respect to the vehicle body on the basis of the output pulse width. In the present embodiment, the moving velocity of the sliding door 1 is determined on the basis of the number of rotations of the drive motor 4. However, the moving velocity of the sliding door 1 may also be determined directly from the phase displacement thereof.

The common brush 4a of the drive motor 4 is connected to the negative terminal of the battery 7, and the high-speed brush 4b and the low-speed brush 4c are respectively connected to the first terminal 9b and the second terminal 9c of the relay 9 in a switchable manner. The relay 9 is connected to the control circuit 8, and is switched between the first terminal 9b and the second terminal 9c by the control circuit 8. The common terminal 9a in the relay 9 is connected to the positive terminal of the battery 7 with the voltage regulator circuit 10 interposed therebetween.

When the relay 9 is switched to connect the first terminal 9b and the common terminal 9a so that a voltage is applied between the common brush 4a and the high-speed brush 4b, the drive motor 4 operates in a high-speed mode in which the drive motor 4 rotates with a relatively low torque at a high velocity. This is because a conductive slider of a coil connected between the common brush 4a and the high-speed brush 4b in series is set to be relatively small.

In addition, when the relay 9 is switched to connect the second terminal 9c and the common terminal 9a so that a voltage is applied between the common brush 4a and the low-speed brush 4c, the drive motor 4 operates a low-speed mode in which the drive motor 4 rotates with a relatively high torque at a low velocity. This is because a conductive slider of a coil connected between the common brush 4a and the low-speed brush 4c in series is set to be relatively small.

As described above, the control circuit 8 switches the mode of the drive motor 4 between the high-speed mode and the low-speed mode by switching the relay 9. The control circuit 8 compares the velocity of the sliding door 1 at a predetermined position with a predetermined threshold velocity, and sets the mode of the drive motor 4 to the high-speed mode or the low-speed mode depending on the result of comparison.

The threshold velocity and target velocities when the drive motor 4 is set to the high-speed mode or the low-speed mode will be described below with reference to FIG. 3.

When the drive motor 4 is set to the high-speed mode in the opening/closing operation of the sliding door 1, the velocity of the sliding door 1 varies as shown by H with respect to the position of the sliding door 1. More specifically, after the drive motor 4 is started, the velocity increases, stays constant for a certain time, and is then reduced to a high target velocity $H_t$. Similarly, when the drive motor 4 is set to the low-speed mode, the velocity of the sliding door 1 varies as shown by L with respect to the position of the sliding door 1. More specifically, after the drive motor 4 is started, the velocity increases, stays constant for a certain time, and is then reduced to a low target velocity $L_t$. The high target velocity $H_t$ and the low target velocity $L_t$ are set to suppress the sound generated when the sliding door 1 stops at the fully open position, more specifically, when the sliding door 1 comes into contact with the lock mechanism.

In each mode, the velocity H or L at a predetermined position serves as the threshold velocity to be compared with the actual velocity of the sliding door 1 at the same position. More specifically, when the drive motor 4 is in the high-speed mode and the comparison is to be performed at the position B, the threshold velocity is $H_B$ corresponding to the position B.

Next, processes performed by the control unit 5 in the opening operation of the sliding door 1 will be described with reference to FIGS. 4 to 6. The drive motor 4 is set to the low-speed mode and the voltage applied to the drive motor 4 is set to Vm immediately after the opening operation is started from the fully closed position.

Figure 4:
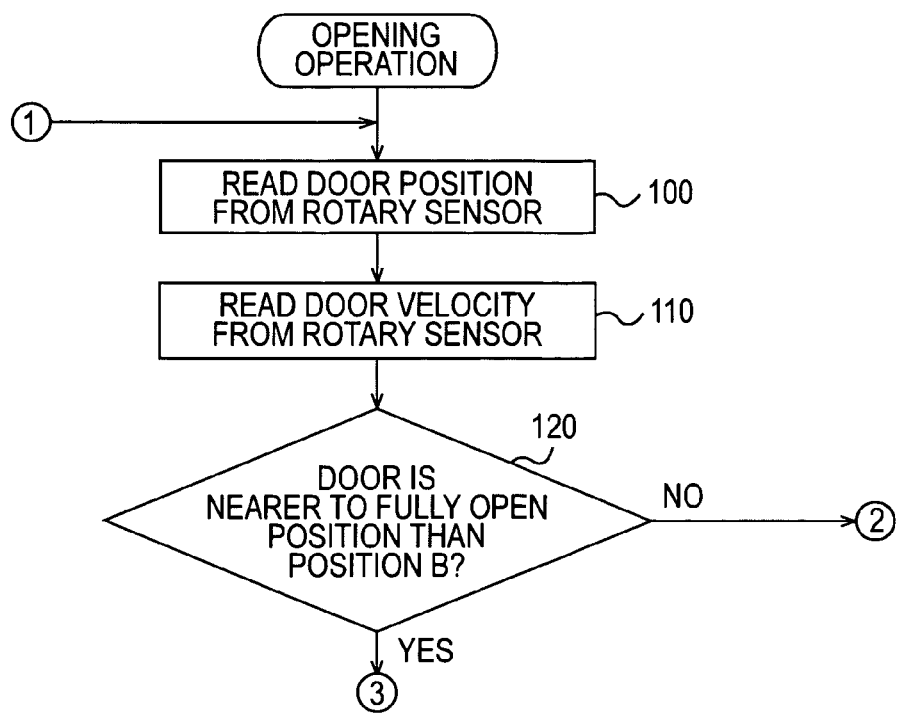
FIG. 4 is a flowchart showing a process performed in the embodiment.

As shown in FIG. 4, when the opening operation of the sliding door 1 is started, the control unit 5 reads the position of the sliding door 1 on the basis of the detection signal from the rotary sensor 6 in Step 100. Then, the control unit 5 reads the moving velocity of the sliding door 1 on the basis of the detection signal from the rotary sensor 6 in Step 110.

Then, the control unit 5 determines whether or not the sliding door 1 is nearer to the fully open position than the position B in Step 120. In other words, the control unit 5 determines whether or not the sliding door 1 has reached the position B. If the control unit 5 determines that the sliding door 1 has not yet reached the position B, the control unit 5 performs a process shown in FIG. 5. If the control unit 5 determines that the sliding door 1 has reached the position B, the control unit 5 performs a process shown in FIG. 6.

Figure 5:
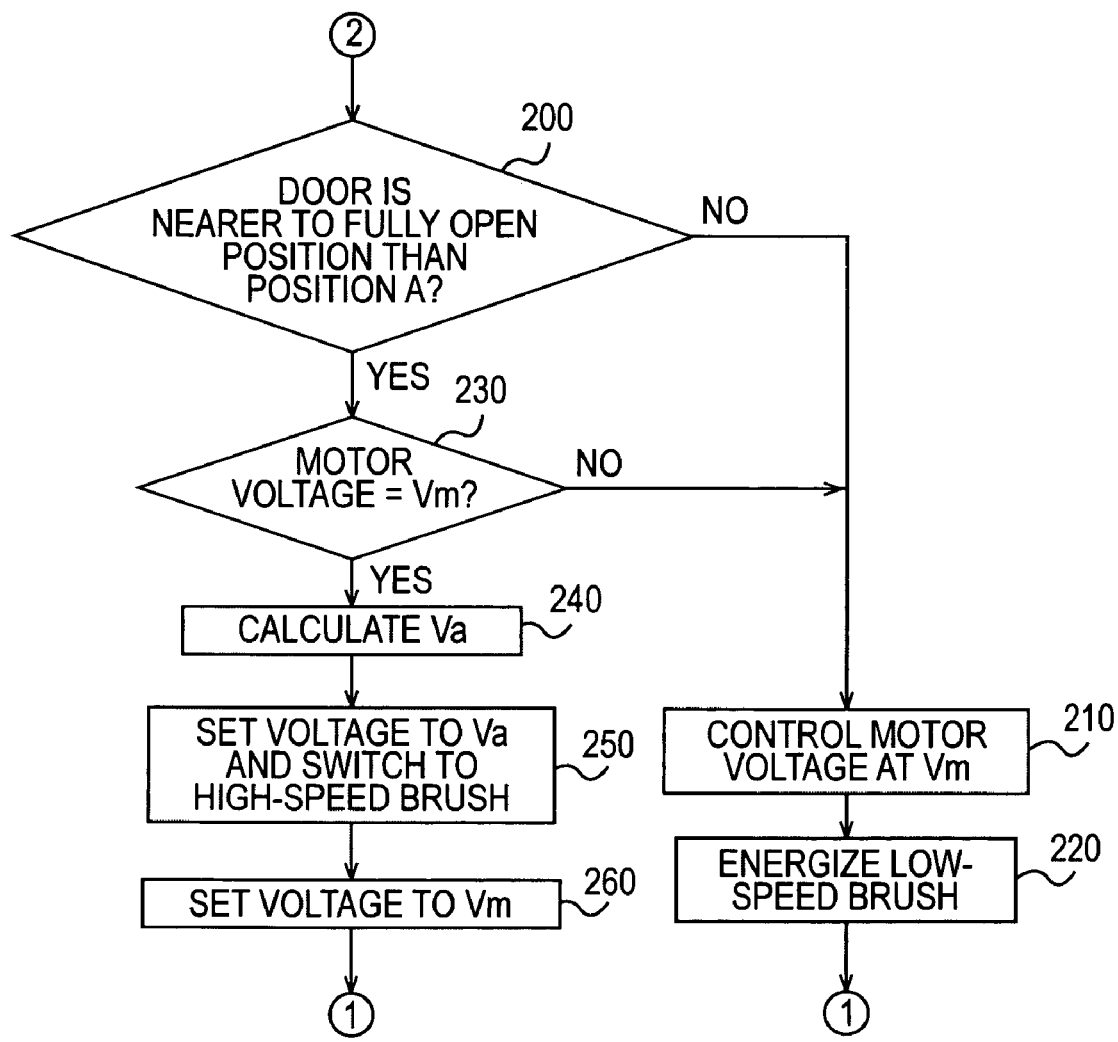
FIG. 5 is a flowchart showing another process performed in the embodiment.

As shown in FIG. 5, if the sliding door 1 has not yet reached the position B, the control unit 5 determines whether or not the sliding door 1 is nearer to the fully open position than the position A in Step 200. In other words, the control unit 5 determines whether or not the sliding door 1 has reached the position A. If the control unit 5 determines that the sliding door 1 has not yet reached the position A, the control unit 5 proceeds to Step 210, and maintains the voltage applied to the drive motor 4 at Vm. Then, in Step 220, the control unit 5 keeps energizing the low-speed brush 4c, in other words, maintains the low-speed mode. Then, the control unit 5 returns to Step 100, and repeats the following steps.

If the control unit 5 determines that the sliding door 1 is nearer to the fully open position than the position A, that is, if the control unit 5 determines that the sliding door 1 has reached the position A in Step 200, the control unit 5 proceeds to Step 230 and determines whether or not the motor voltage is increased to Vm. If it is determined that the motor voltage is not increased to Vm, the control unit 5 proceeds to Steps 210 and 220. Accordingly, the control unit 5 sets the motor voltage to Vm and maintains the low-speed mode. Then, the control unit 5 returns to Step 100, and repeats the following steps.

If it is determined that the motor voltage is increased to Vm in Step 230, the control unit 5 proceeds to Step 240 and calculates a voltage Va to be applied to the drive motor 4 for switching the mode of the drive motor 4 from the low-speed mode to the high-speed mode. This voltage Va is set to prevent the moving velocity of the sliding door 1 from changing when the mode of the drive motor 4 is switched between the high-speed mode and the low-speed mode.

Then, the control unit 5 proceeds to Step 250. In Step 250, the control unit 5 controls the voltage applied to the drive motor 4 at Va using the voltage regulator circuit 10 and switches the connection of the terminals in the relay 9 to energize the first terminal 9b. In other words, the control unit 5 switches the mode of the drive motor 4 from the low-speed mode to the high-speed mode. Then, in Step 260, the control unit 5 sets the voltage applied to the drive motor 4 to Vm. Then, the control unit 5 returns to Step 100, and repeats the following steps.

As described above, the control unit 5 sets the drive motor 4 to the low-speed mode while the sliding door 1 is between the fully closed position and the position A in the opening operation of the sliding door 1. Accordingly, the drive motor 4 exerts a relatively high torque.

Figure 6:
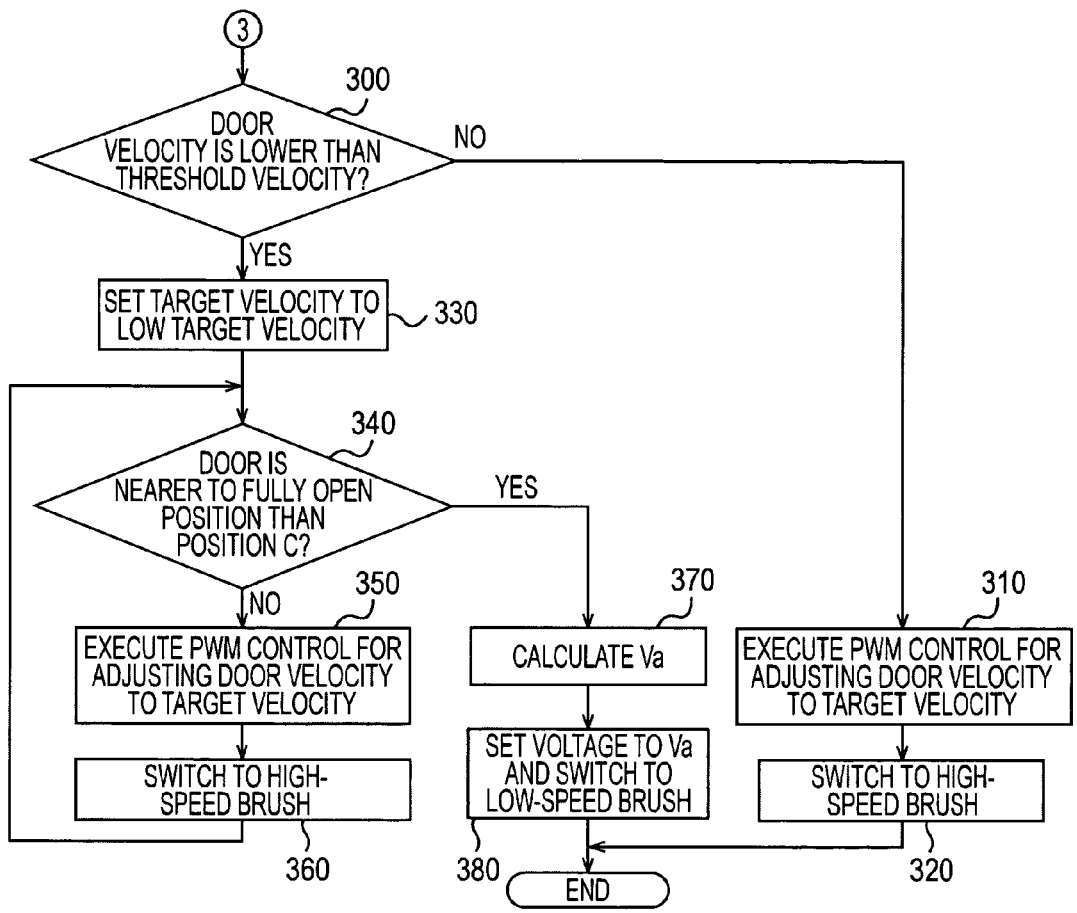
FIG. 6 is a flowchart showing another process performed in the embodiment.

If it is determined that the sliding door 1 is nearer to the fully open opposition than the position B in Step 120, that is, if it is determined that the sliding door 1 has reached the position B, the control unit 5 determines whether or not the velocity of the sliding door 1 is lower than the threshold velocity in Step 300, as shown in FIG. 6. In the present embodiment, the threshold velocity is set to $H_B$ as shown in FIG. 3.

If it is determined that the velocity of the sliding door 1 is not lower than the threshold velocity, that is, if it is determined that the sliding door 1 is moving at the threshold velocity, the control unit 5 proceeds to Step 310 and performs pulse width modulation (PWM) control of the drive motor 4 for adjusting the moving velocity of the sliding door 1 to a target velocity.

Figure 3:
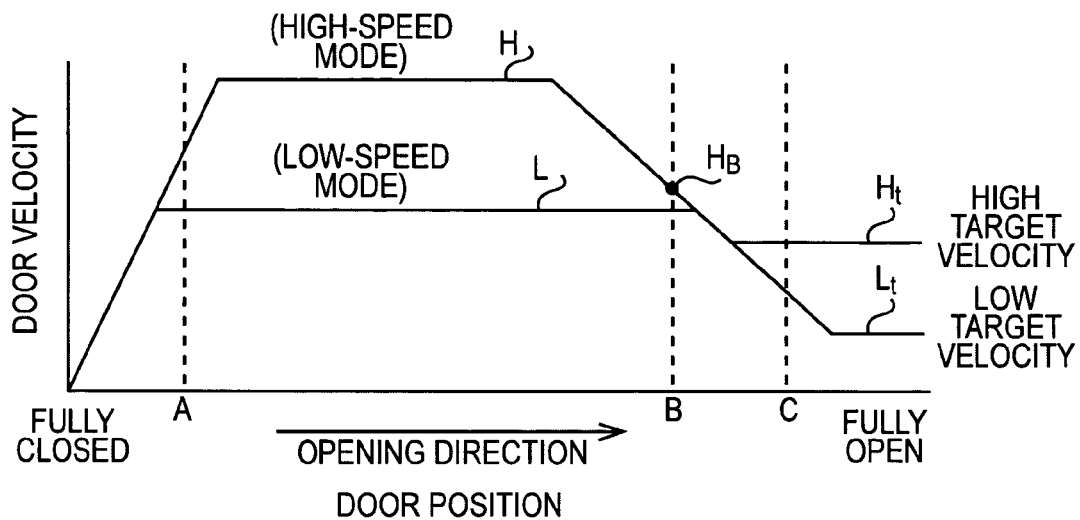
FIG. 3 is a position-velocity characteristic diagram showing target velocities of a sliding door according to the present embodiment.

At this time, the target velocity is set to the high target velocity shown in FIG. 3. Then, the control unit 5 proceeds to Step 320 and maintains the high-speed mode of the drive motor 4. Then, the control unit 5 finishes the process of the opening operation of the sliding door 1.

Figure 7:
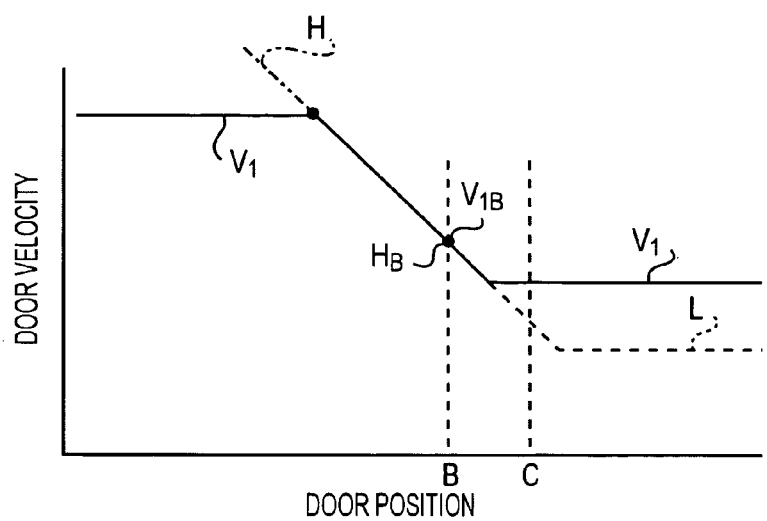
FIG. 7 is a position-velocity characteristic diagram of the sliding door according to the present embodiment.

More specifically, as shown in FIG. 7, if the moving velocity $V_1$ of the sliding door 1 is $V_{1B}$ at the position B and is equal to $H_B$ (threshold velocity), the control unit 5 sets the drive motor 4 to the high-speed mode at the position C. Accordingly, the target velocity of the sliding door 1 is set to the high target velocity.

If it is determined that the velocity of the sliding door 1 is lower than the threshold velocity in Step 300, the control unit 5 proceeds to Step 330 and sets the target velocity of the sliding door 1 to the low target velocity.

Figure 8:
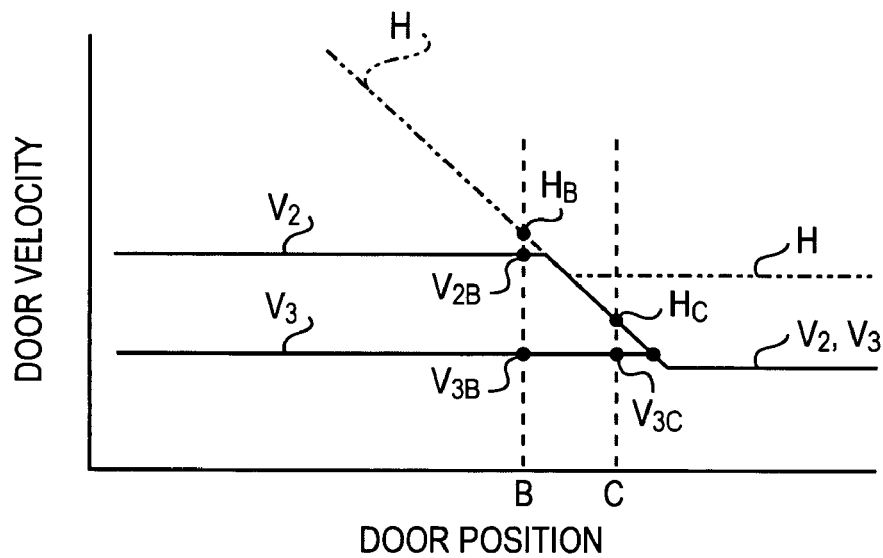
FIG. 8 is another position-velocity characteristic diagram of the sliding door according to the present embodiment.

More specifically, as shown in FIG. 8, if the moving velocity $V_2$ of the sliding door 1 is $V_{2B}$ at the position B and is lower than $H_B$ (threshold velocity), the control unit 5 sets the drive motor 4 to the low-speed mode at the position C. Accordingly, the target velocity of the sliding door 1 is set to the low target velocity.

In addition, if the moving velocity $V_3$ of the sliding door 1 is $V_{3B}$ and $V_{3C}$ at the positions B and C, respectively, and the velocities $V_{3B}$ and $V_{3C}$ are lower than $H_B$ and $H_C$ (threshold velocities), respectively, the control unit 5 starts decelerating control with the low target velocity when the moving velocity of the sliding door 1 becomes equal to the velocity L in the low-speed mode. Then, the control unit 5 proceeds to Step 340 and determines whether or not the sliding door 1 is nearer to the fully open position than the position C, that is, whether or not the sliding door 1 has reached the position C.

If it is determined that the sliding door 1 has not yet reached the position C, the control unit 5 proceeds to Step 350 and performs PWM control of the drive motor 4 for adjusting the moving velocity of the sliding door 1 at a target velocity. At this time, the target velocity is set to the high target velocity shown in FIG. 3. Then, the control unit 5 proceeds to Step 360 and maintains the high-speed mode of the drive motor 4. Then, the control unit 5 returns to Step 340 and performs the following steps. More specifically, the control unit 5 performs the PWM control for adjusting the velocity of the sliding door 1 to the high target velocity until the sliding door 1 moves toward the fully open position beyond the position C.

In addition, if it is determined that the sliding door 1 has reached the position C in Step 340, the control unit 5 calculates the voltage Va in Step 370. Then, in Step 380, the control unit 5 controls the voltage applied to the drive motor 4 at Va using the voltage regulator circuit 10 and switches the connection of terminals in the relay 9 to energize the second terminal 9c. In other words, the control unit 5 switches the mode of the drive motor 4 from the high-speed mode to the low-speed mode. Then, the control unit 5 finishes the process of the opening operation of the sliding door 1.

In addition, also when the moving direction of the sliding door 1 that is being closed from the fully open operation is reversed, the control unit 5 can adequately move the sliding door 1 by performing the above-described processes.

Figure 9:
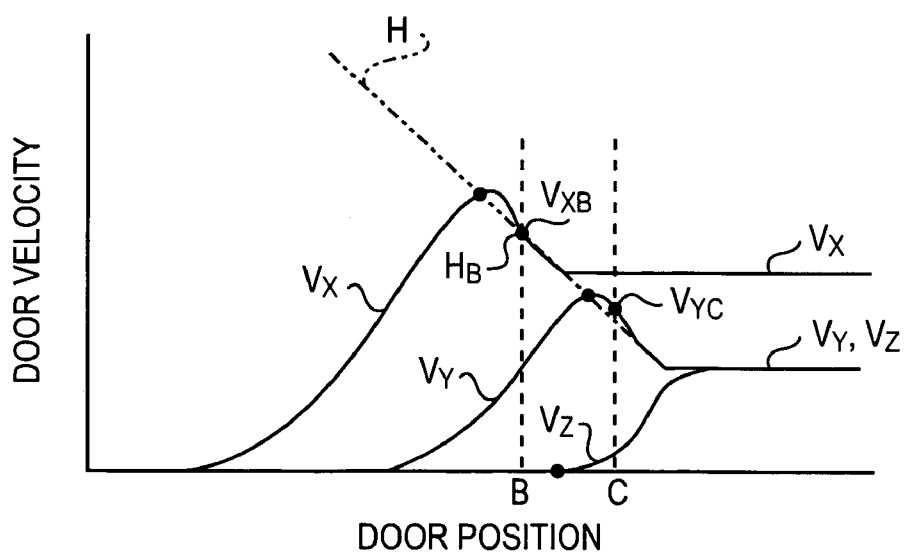
FIG. 9 is another position-velocity characteristic diagram of the sliding door according to the present embodiment.

For example, as shown by the moving velocity $V_x$ in FIG. 9, when the position at which the moving direction of the sliding door 1 is reversed is nearer to the fully closed position than the position B and the velocity of the sliding door 1 at the position B is equal to the threshold velocity, the control unit 5 maintains the high-speed mode of the drive motor 4 at the position C.

In addition, as shown by the velocity $V_y$ in FIG. 9, when the position at which the moving direction of the sliding door 1 is reversed is nearer to the fully closed position than the position B but the velocity of the sliding door 1 at the position B is lower than the threshold velocity, the control unit 5 switches the drive motor 4 to the low-speed mode at the position C.

In addition, as shown by the velocity $V_z$ in FIG. 9, when the position at which the moving direction of the sliding door 1 is reversed is nearer to the fully open position than the position B, the control unit 5 drives the drive motor 4 in the low-speed mode and sets the target velocity to the low target velocity.

As described above, the present embodiment provides the following effects:

(1) According to the present embodiment, when the rotary sensor 6 detects that the sliding door 1 has reached the position B, the control unit 5 compares the moving velocity of the sliding door 1 detected by the rotary sensor 6 with the threshold velocity, and drives the drive motor 4 in the high-speed mode or the low-speed mode depending on the result of comparison. Thus, the drive motor 4 is set to the high-speed mode or the low-speed mode depending on the actual velocity of the sliding door 1 at the position B, and the mode is selected in accordance with the state of the sliding door 1. Accordingly, the sliding door 1 is adequately moved irrespective of the load applied to the sliding door 1.

(2) According to the present embodiment, the control unit 5 sets the drive motor 4 to the high-speed mode or the low-speed mode depending on whether or not the velocity of the sliding door 1 is increased to the threshold velocity at the position B. Therefore, when the sliding door 1 is moving at the threshold velocity, the drive motor 4 is moved in the high-speed mode at a high velocity. If the sliding door 1 is not moving at the threshold velocity because of load applied thereto, the drive motor 4 is driven in the low-speed mode to exert a high torque so that the sliding door 1 can be reliably moved.

(3) According to the present embodiment, the mode at the position C is set in accordance with the result of comparison at the position B, and only mode setting is performed at the position C. Therefore, the control operation is efficiently performed.

(4) According to the present embodiment, the target velocity of the sliding door 1 is set to either the high target velocity or the low target velocity. Therefore, an adequate mode can be selected on the basis of the result of comparison between the velocity of the sliding door 1 and the threshold velocity.

(5) According to the present embodiment, PWM control of the drive motor 4 is performed such that the moving velocity is adjusted to either the high target velocity or the low target velocity. Therefore, an adequate velocity control is performed.

(6) According to the present embodiment, when the mode of the drive motor 4 is switched, velocities of the sliding door 1 immediately before and after the mode is switched are substantially the same. Therefore, sudden change in the movement of the sliding door 1 does not occur, and operability is ensured.

The embodiment of the present invention may also be modified as below:

Although the opening operation of the sliding door 1 is described in the above-described embodiment, similar control may be used in the closing operation of the sliding door 1.

Although the rotary sensor 6 is provided for detecting the position and velocity of the sliding door 1 in the above-described embodiment, means for detecting the position and velocity of the sliding door 1 is not limited to this.

Although the control process according to the above-described embodiment is performed in a region near the fully open position to ensure the movement of the sliding door 1 in this region when the sliding door 1 is opened, the control process may also be performed at any region along the moving direction of the sliding door 1.

Although the mode to be switched at the position C is selected by comparing the moving velocity of the sliding door 1 and the threshold velocity at the position B in the above-described embodiment, the mode can be switched at the position where the moving velocity of the sliding door 1 is compared with the threshold velocity.

The target velocity according to the above-described embodiment may be set in any way. In addition, the setting of the target velocity can be selected depending on the state of the vehicle.

Although the sliding door is explained as an example of an opening/closing body in the above-described embodiment, the opening/closing body is not limited to sliding doors. For example, the opening/closing body may also be a window regulator, a sunroof, etc.

The invention claimed is:

1. A control apparatus for controlling an opening/closing body that opens and closes an opening in a vehicle body by moving with respect to the vehicle body, the control apparatus comprising:
a drive motor that switches between a low-speed mode for moving the opening/closing body with a relatively high torque at a low velocity and a high-speed mode for moving the opening/closing body with a relatively low torque at a high velocity;
a position sensor that detects the position of the opening/closing body with respect to the vehicle body;
a velocity sensor that detects the velocity of the opening/closing body; and
a control unit that compares the velocity of the opening/closing body with a threshold velocity when the opening/closing body reaches a first predetermined position and sets the drive motor to one of the low-speed mode and the high-speed mode depending on the result of comparison,
wherein the control unit sets a target velocity of the opening/closing body to a high target velocity for moving the opening/closing body in the high-speed mode, and the control unit sets a target velocity of the opening/closing body to a low target velocity for moving the opening/closing body in the low-speed mode.

2. The control apparatus according to claim 1, wherein the control unit sets the driver motor to the high-speed mode when the velocity of the opening/closing body is increased to the threshold velocity.

3. The control apparatus according to claim 2, wherein the control unit sets a target velocity of the opening/closing body to a high target velocity for moving the opening/closing body in the high-speed mode.

4. The control apparatus according to claim 1, wherein the control unit sets the driver motor to the low-speed mode when the velocity of the opening/closing body is not increased to the threshold velocity.

5. The control apparatus according to claim 4, wherein the control unit sets a target velocity of the opening/closing body to a low target velocity for moving the opening/closing body in the low-speed mode.

6. The control apparatus according to claim 1, wherein the control unit compares the velocity of the opening/closing body with the threshold velocity at the first predetermined position and sets the drive motor to the high-speed mode at a second predetermined position depending on the result of comparison.

7. The control apparatus according to claim 6, wherein the control unit sets a target velocity of the opening/closing body to a high target velocity for moving the opening/closing body in the high-speed mode.

8. The control apparatus according to claim 6, wherein the first predetermined position is located between a fully closed position where the opening/closing body is fully closed and a fully opened position where the opening/closing body fully opens.

9. The control apparatus according to claim 6, wherein the second predetermined position is a position where the opening/closing body fully opens.

10. The control apparatus according to claim 1, wherein the control unit compares the velocity of the opening/closing body with the threshold velocity at the first predetermined position and sets the drive motor to the low-speed mode at a second predetermined position depending on the result of comparison.

11. The control apparatus according to claim 10, wherein the control unit sets a target velocity of the opening/closing body to a low target velocity for moving the opening/closing body in the low-speed mode.

12. The control apparatus according to claim 10, wherein the first predetermined position is located between a fully closed position where the opening/closing body is fully closed and a fully opened position where the opening/closing body fully opens.

13. The control apparatus according to claim 10, wherein the second predetermined position is a position where the opening/closing body fully opens.

14. The control apparatus according to claim 1, wherein the control unit performs PWM control of the drive motor to adjust the velocity of the opening/closing body to the high target velocity.

15. The control apparatus according to claim 1, wherein the control unit performs PWM control of the drive motor to adjust the velocity of the opening/closing body to the low target velocity.

16. The control apparatus according to claim 1, wherein the control unit switches the drive motor between the high-speed mode and the low-speed mode such that the velocities of the opening/closing body immediately before and after switching are substantially the same.

17. The control apparatus according to claim 1, wherein, when the opening/closing body reaches a first predetermined position, the control unit sets the driver motor to the high-speed mode when the velocity of the opening/closing body is detected by the velocity sensor to be moving at the threshold velocity and the control unit sets the driver motor to the low-speed mode when the velocity of the opening/closing body is detected by the velocity sensor to be moving at less than the threshold velocity.

18. The control apparatus according to claim 1, wherein each of the high target velocity and the low target velocity indicates the target velocity from a position where the opening/closing body is fully closed to a position where the opening/closing body is fully opened, and the high target velocity is different from the low target velocity.

* * * * *

UNITED STATES PATENT AND TRADEMARK OFFICE
CERTIFICATE OF CORRECTION

| | | |
|---|---|---|
| PATENT NO. | : 7,617,034 B2 | Page 1 of 1 |
| APPLICATION NO. | : 11/168389 | |
| DATED | : November 10, 2009 | |
| INVENTOR(S) | : Shintaro Suzuki | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Nineteenth Day of October, 2010

David J. Kappos
*Director of the United States Patent and Trademark Office*